United States Patent
Shimizu

[11] Patent Number: 6,064,831
[45] Date of Patent: May 16, 2000

[54] ATTACHING METHOD FOR A MAGNETIC HEAD USED IN A CAMERA AND ATTACHMENT FOR THE SAME

[75] Inventor: Motokazu Shimizu, Saitama, Japan

[73] Assignee: Fuji Photo Optical Co., Ltd., Saitama, Japan

[21] Appl. No.: 09/262,050

[22] Filed: Mar. 4, 1999

[30] Foreign Application Priority Data

Mar. 11, 1998 [JP] Japan .................................. 10-059554

[51] Int. Cl.[7] .................................................. G03B 17/24
[52] U.S. Cl. .......................... 396/310; 396/312; 396/319; 396/320
[58] Field of Search .................................. 396/310, 312, 396/319, 320; 360/104, 129

[56] References Cited

U.S. PATENT DOCUMENTS

| | | | |
|---|---|---|---|
| 4,003,092 | 1/1977 | Hirata | 360/109 |
| 5,028,940 | 7/1991 | Person | 396/320 |
| 5,307,100 | 4/1994 | Kubo | 396/319 |
| 5,555,045 | 9/1996 | Tsujimoto et al. | 396/320 |
| 5,761,555 | 6/1998 | Ishihara et al. | 396/319 |
| 5,862,423 | 1/1999 | Ishihara | 396/320 |

*Primary Examiner*—Eddie C. Lee
*Attorney, Agent, or Firm*—Sughrue, Mion, Zinn, Macpeak & Seas, PLLC

[57] ABSTRACT

A film supporting plate made of a plastic is formed with a window into which a head holder made of a metallic thin plate is inserted. The head holder has an opening for baring a magnetic head, and holds a head base on which the magnetic head is mounted. An adhesive is applied so as to extend from a peripheral face of the head base to a rear face of the head holder. When the adhesive is hardened, the head base adheres to the head holder and is fixed relative to the film supporting plate. A thickness of the head holder is thin in comparison with that of the film supporting plate. The head holder is fitted into a front portion of the window of the film supporting plate so that the head base enters the window. A protrusion amount of the head base toward the back side is reduced by an amount of the head base entering the window.

13 Claims, 4 Drawing Sheets

ATTACHING METHOD FOR A MAGNETIC HEAD USED IN A CAMERA AND ATTACHMENT FOR THE SAME

BACKGROUND OF THE INVENTION

1. Field of the Invention

The present invention relates to an attaching method for a magnetic head used in a camera, and to an attachment for the same, in which the magnetic head contacts a magnetic recording layer of a photographic film to perform magnetic recording and/or reproduction.

2. Description of the Related Art

A photographic film having a magnetic recording layer is known. The magnetic recording layer is formed such that a magnetic material is applied to an opposite face of a photographic emulsion face. It is possible to record magnetic information in the magnetic recording layer. As the magnetic information, there are a frame number, a film sensitivity, a photographable number, a product name, and so forth which are specified at the time of manufacturing. When a photograph is taken, the magnetic information is read out to be used for setting a photographic condition. At the same time, various conditions of photographing are recorded in the magnetic recording layer.

In a camera which employs the photographic film having the magnetic recording layer, a magnetic head for performing magnetic recording and/or reproduction is provided. It is conventional that the magnetic head is attached to a film supporting plate which supports the back of the photographic film positioned at an exposure position. The film supporting plate keeps flatness of an exposure face of the photographic film.

FIG. 4 shows a conventional attachment portion of the magnetic head used for a camera. Behind a photographic film 11 positioned at the exposure position, namely at an above portion of the photographic film 11 in the drawing, a film supporting plate 13 is disposed. The film supporting plate 13 supports the photographic film 11 to keep flatness of an exposure face thereof. A magnetic head 14 is attached to a head base 15 so as to protrude from a front face of the head base 15. The magnetic head 14 is fixed to the film supporting plate 13 from its back side. The film supporting plate 13 is formed with an opening 16 for baring the magnetic head 14. The head base 15 holding the magnetic head 14 is positioned such that a protrusion amount of the magnetic head 14 relative to the opening 16 becomes a prescribed protrusion amount A.

When the protrusion amount of the magnetic head 14 is the prescribed amount A, the magnetic head 14 comes into contact with the magnetic recording layer of the photographic film 11 in a suitable pressure. Then, an adhesive is applied so as to extend from the periphery of the head base 15 to the back of the film supporting plate 13. This adhesive is hardened so that an adhesive portion 17 is formed. In this way, the head base 15 is fixed in a state that its front face is supported by the rear face of the film supporting plate 13.

The adhesive portions 17 are formed at plural places around the head base 15. The adhesive portions 17 are generally formed at two places being opposite with each other. As the adhesive forming the adhesive portion 17, for example, an ultraviolet-curing adhesive is used. The ultraviolet-curing adhesive has flowability in a normal state, and is hardened by radiation of the ultraviolet lays. Incidentally, a protrusion amount B of the magnetic head 14 relative to the head base 15 is determined in accordance with the prescribed protrusion amount A and a thickness of the film supporting plate 13.

As to the above-mentioned method in which the front of the head base 15 is fixed so as to be supported by the back of the film supporting plate 13, the head base 15 protrudes toward the back side of the film supporting plate 13 by a thickness of itself. By the way, it is very difficult to thin the thickness of the film supporting plate 13 which is an injection-molded article. The limit of this thickness is about 1.0 mm. Thus, with respect to the camera containing the film supporting plate 13 to which the magnetic head 14 is attached, it is necessary to widen a containing space in a direction of the thickness of the film supporting plate 13. Accordingly, there arises a problem in that the camera is prevented from being thinned.

SUMMARY OF THE INVENTION

In view of the foregoing, it is a primary object of the present invention to provide an attaching method for a magnetic head used in a camera in which a space for containing a film supporting plate, to which the magnetic head is attached, is reduced.

It is a second object of the present invention to provide an attaching method for a magnetic head in which an adhesive for fixing the magnetic head is prevented from flowing out to a film supporting plate.

It is a third object of the present invention to provide an attachment for a magnetic head used in a camera in which a space for containing a film supporting plate, to which the magnetic head is attached, is reduced.

In order to achieve the above and other objects, the attaching method for the magnetic head according to the present invention comprises a step of fitting a head holder for holding the magnetic head into a window formed in a film supporting plate. Moreover, the attachment for the magnetic head according to the present invention comprises the head holder via which the magnetic head is attached to the film supporting plate.

In a preferred embodiment, the head holder is made of a metallic thin plate. The head holder is formed with an opening for baring the magnetic head which is attached to a head base. After the head holder has been fitted into the window of the film supporting plate, the head base is fixed to the head holder so as to bare the magnetic head through the opening of the head holder.

The head holder is positioned at a front portion in the window of the film supporting plate. A thickness of the head holder is extremely thin in comparison with that of the film supporting plate so that the head base fixed to the head holder enters the window of the film supporting plate. A protrusion amount of the head base toward its back side is reduced by an amount of the head base entering the window of the film supporting plate. Thus, it is possible to reduce a space for containing the film supporting plate to which the magnetic head is fixed.

In this way, the magnetic head is fixed to the film supporting plate via the head holder made of the metallic thin plate. The attached magnetic head comes into contact with a magnetic recording layer formed on a rear face of a photographic film, and performs magnetic recording and/or reproduction.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT (S)

Figure 2:
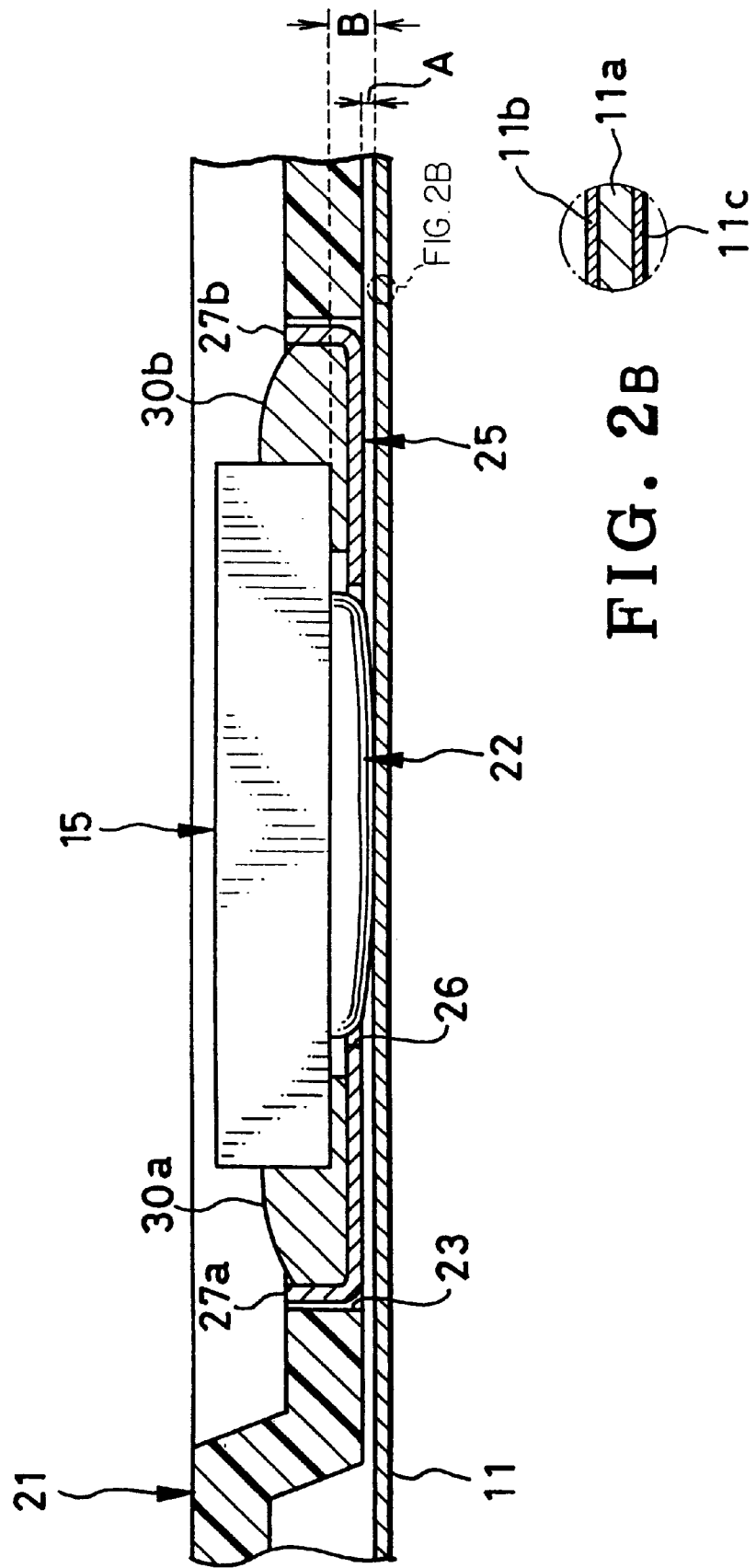
FIG. 2 is a partially sectional view of the attachment portion of the magnetic head shown in FIG. 1.
Figure 3:
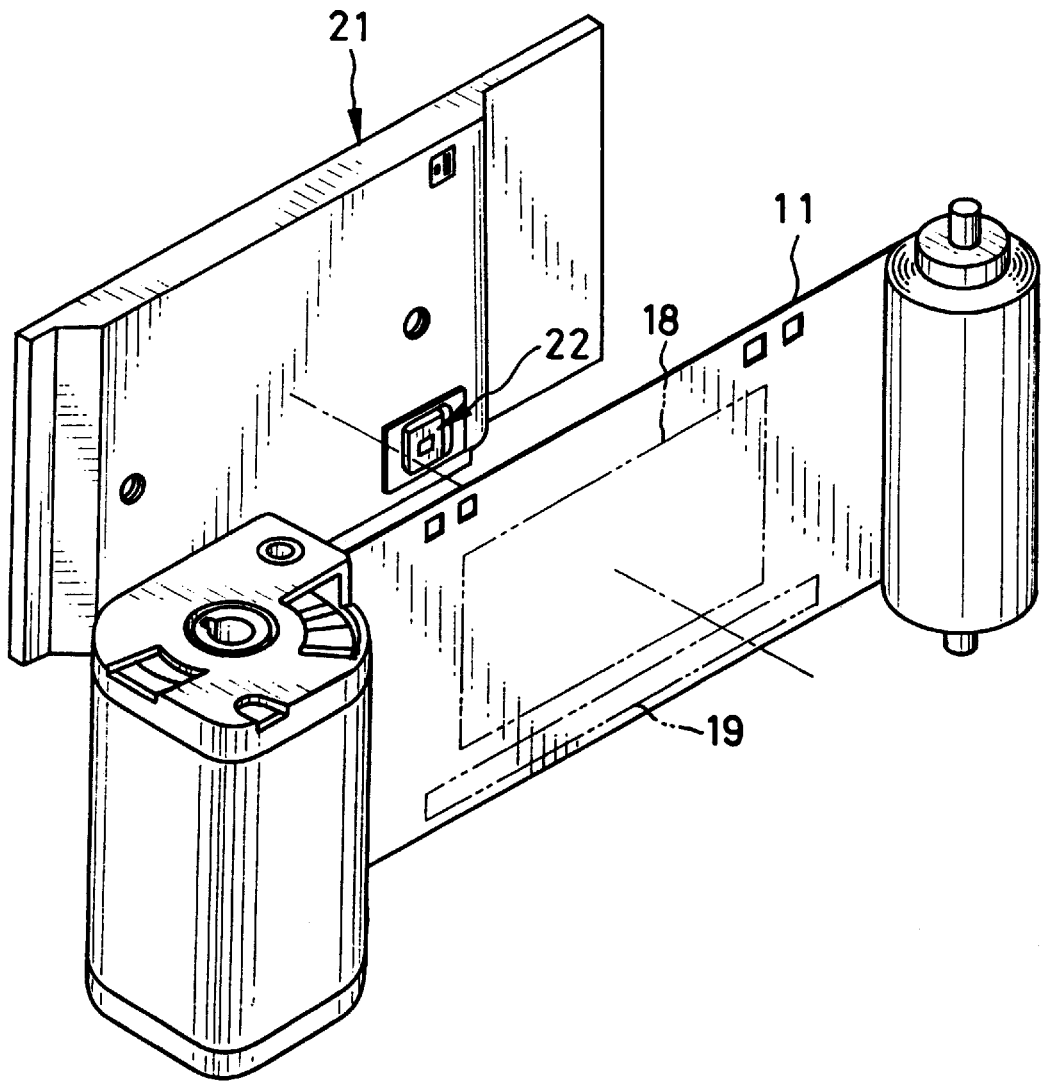
FIG. 3 is a schematic illustration showing the attachment portion of the magnetic head provided in a camera.
Figure 4:
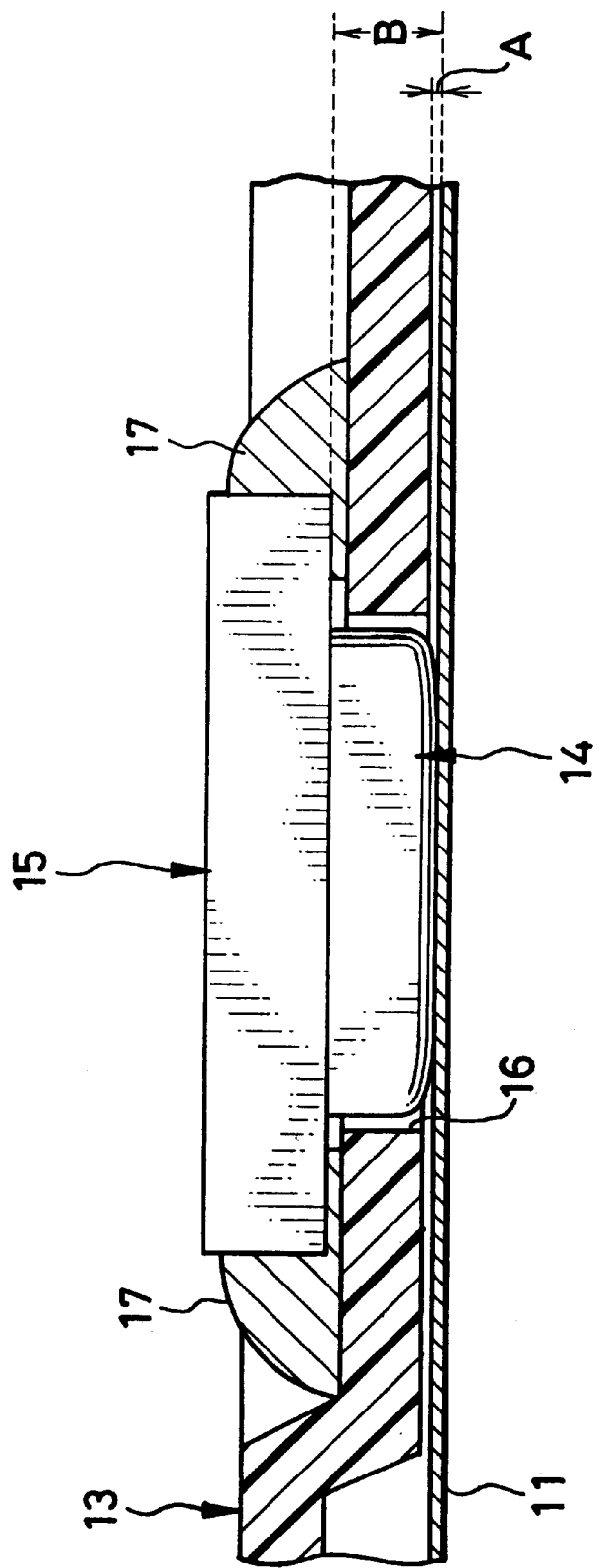
FIG. 4 is a partially sectional view showing the attachment portion of the magnetic head of a conventional camera.

FIG. 3 relates to a camera having a built-in magnetic head, and shows an attachment portion of the magnetic head according to the present invention. Each member which is similar to that in FIG. 4 is denoted by the same reference numeral. In the camera, an exposure aperture (not shown) is provided. The exposure aperture defines a frame 18 of a photographic film 11. Behind the frame 18 defined by the exposure aperture, a film supporting plate 21 is provided. The film supporting plate 21 supports the photographic film 11 of the exposure position from its back side to keep the flatness thereof. A magnetic material is applied to the rear face of the photographic film 11 to form a magnetic recording layer 19 shown in FIG. 3. This magnetic recording layer is more detailed, referring to FIG. 2. The magnetic recording layer comprises a base member 11a, a photosensitive layer 11b, and a magnetic recording layer 11c. The magnetic recording layer 11c is transparent. By the way, a magnetic head 22 is attached to the film supporting plate 21. The magnetic head 22 comes into contact with the magnetic recording layer 19 of the photographic film 11 to perform the magnetic recording and/or reproduction.

Figure 1:
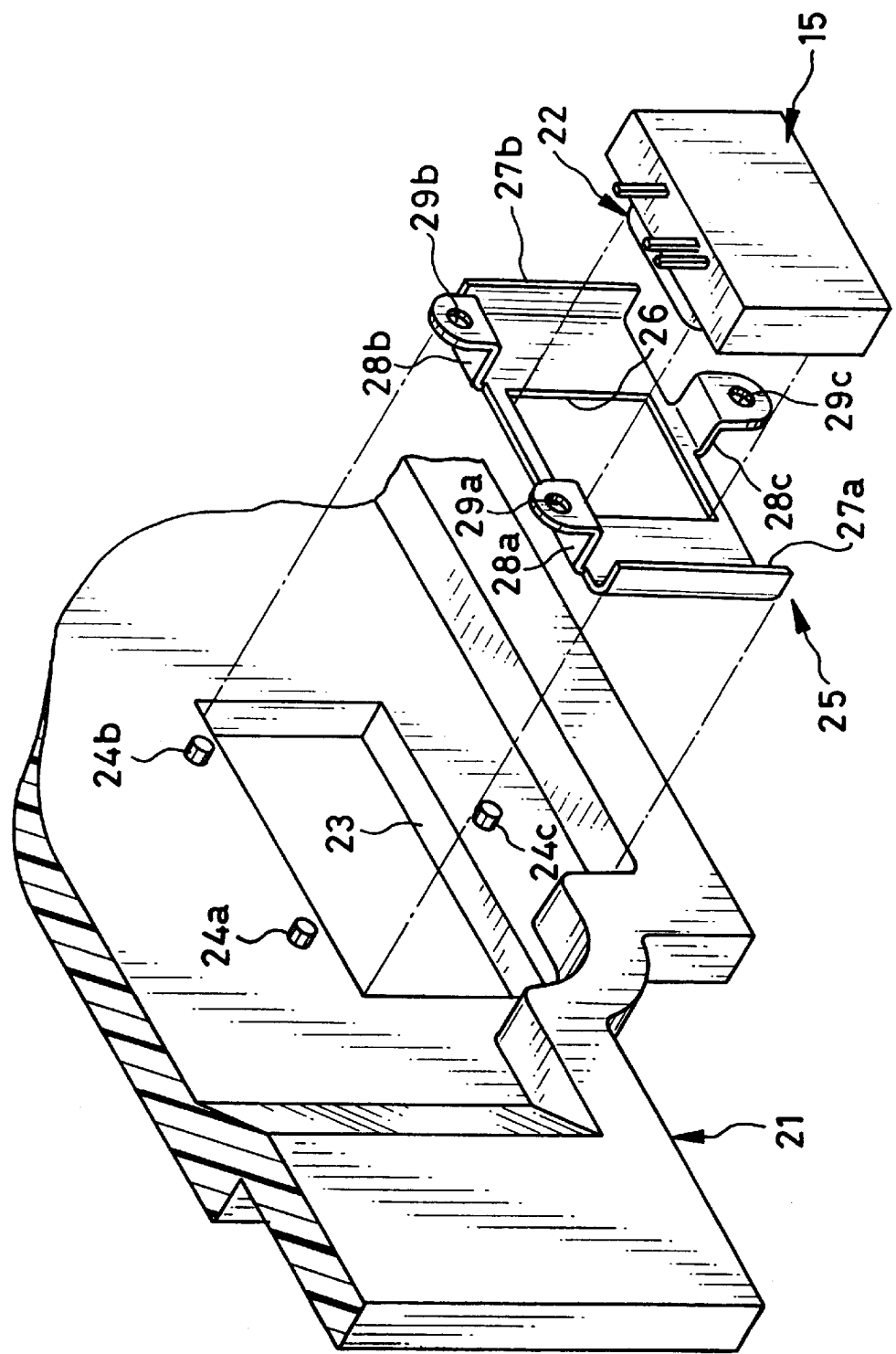
FIG. 1 is a schematic illustration showing structure of an attachment portion of a magnetic head according to the present invention.

As shown in FIGS. 1 and 2, the magnetic head 22 is attached to a head base 15 so as to protrude from a front face of the head base 15. The film supporting plate 21 is formed by means of injection molding, using a plastic. The film supporting plate 21 is formed with a window 23 for baring the head base 15 holding the magnetic head 22. Projections 24a, 24b and 24c protruding to the back side are provided around the window 23.

A head holder 25 is fitted into the window 23 of the film supporting plate 21. The head holder 25 is formed such that a thin plate made of metal is pressed. A central portion of the head holder 25 is formed with an opening 26 through which the magnetic head 22 protrudes. At both edges of the head holder 25, a pair of ribs 27a and 27b protruding to the back side are respectively provided. Further, the head holder 25 is integrally provided with three tabs 28a, 28b and 28c. These tabs 28a–28c are respectively formed with holes 29a, 29b and 29c for engaging with the projections 24a–24c which are provided on the film supporting plate 21. When the projections 24a–24c engage with the holes 29a–29c, the head holder 25 is positioned at a front portion in the window 23, and is fixed in a state that the front face of the head holder 25 is leveled relative to the front face of the film supporting plate 21.

The magnetic head 22 attached to the head base 15 is inserted into the opening 26 of the head holder 25. The head base 15 is positioned such that a protrusion amount of the magnetic head 22 relative to the front of the film supporting plate 21 becomes a prescribed amount A. When the protrusion amount of the magnetic head 22 is set to the prescribed amount A, the magnetic head 22 abuts on the magnetic recording layer 19 of the photographic film 11 in a proper pressure. Between the respective ribs 27a, 27b and the peripheral face of the head base 15, adhesives 30a and 30b are applied and hardened. Due to these adhesives 30a and 30b, the head base 15 is fixed to the head holder 25. As the adhesives 30a and 30b, an ultraviolet-curing adhesive is used, for example. The ultraviolet-curing adhesive has flowability in a normal state, and is hardened by radiation of the ultraviolet lays. On the other hand, a protrusion amount B of the magnetic head 22 relative to the head base 15 is determined in accordance with the prescribed protrusion amount A and a thickness of the head holder 25.

Before the magnetic head 22 is fixed to the film supporting plate 21, at the outset, the film supporting plate 21 is positioned in a state that its rear face is directed upward. Then, the head holder 25 is fitted into the window 23 so as to insert the projections 24a–24c into the holes 29a–29c. At this time, the head holder 25 is fitted into the front portion in the window 23.

Successively, the magnetic head 22 attached to the head base 15 is inserted into the opening 26 of the head holder 25 from its back side. Then, the head base 15 is positioned such that the protrusion amount of the magnetic head 22 relative to the front face of the film supporting plate 21 is set to the prescribed amount A. Thus, the magnetic head 22 abuts on the magnetic recording layer 19 of the photographic film 11 in a proper pressure.

After the head base 15 has been positioned, the adhesive 30a and 30b are applied to the gaps between the ribs 27a and 27b of the head holder 25 and the peripheral faces of the head base 15. Then, the applied adhesive is hardened. In this way, the head base 15 with the magnetic head 22 is fixed to the film supporting plate 21 via the head holder 25.

Since the head holder 25 is made of a metallic thin plate, it is possible to thin the thickness thereof to a degree of about 0.2 mm. Accordingly, the thickness of the head holder 25 is extremely thinned in comparison with that of the film supporting plate 21 being a plastic mold. On the other hand, the head holder 25 is positioned at the front portion in the window 23. Thus, by attaching the front face of the head base 15 to the head holder 25, the head base 15 is positioned in a state that the head base 15 enters the window 23. Therefore, the protrusion amount of the head base 15 toward the back side is reduced in comparison with that of the conventional method in which the front face of the head base is supported by the rear face of the film supporting plate.

Each of the adhesives 30a and 30b is formed in a groove which is defined by the peripheral face of the head base 15, the rear face of the head holder 25, and a wall of the window 23. Thus, the adhesive is prevented from flowing out to the rear face of the film supporting plate 21, and spreading thereon. Moreover, the ribs 27a and 27b protruding toward the back side are integrally formed on the edges of the head holder 25, and a gap between the wall of the window 23 and the head holder 25 is closed by roots of the ribs 27a and 27b. Due to this, when the adhesives 30a and 30b are formed in the gap between the ribs 17a, 17b and the peripheral faces of the head base 15, the adhesive is prevented from flowing out to the front side of the film supporting plate 21.

In the above-described embodiment, the adhesives are applied at two places of the head base. However, the adhesives may be applied at three places or more. In this case, it is preferable that the head holder is provided with the ribs at all portions where the adhesive is applied. Thereby, the adhesive is prevented from flowing out to the front side of the film supporting plate.

Moreover, in the above embodiment, the rib protruding toward the back side is integrally provided at the edge of the head holder in order to prevent the adhesive from flowing out to the front side of the film supporting plate. And, the adhesive is applied to the gap between the rib and the peripheral face of the head base. However, the adhesive may be applied to a gap between the peripheral face of the head base and the tab for fixing the head holder relative to the film supporting plate. In this case, providing the rib on the head holder is not necessary so that it becomes possible to omit a rib forming process from producing processes of the head holder.

Further, the method for fixing the head base to the rear face of the head supporting board is not exclusive to the adhering method. For example, a heat-welding method, an ultrasonic-welding method, and the other methods may be used.

As described above, in the attaching method for the magnetic method according to the present invention, the film supporting plate is formed with the window for baring the magnetic head. Into this window, the head holder made of a metallic thin plate is fitted. The head holder has the opening for baring the magnetic head. The head base with the magnetic head is positioned such that the magnetic head protrudes, by a prescribed amount, in front of the head holder through the opening thereof. At this time, the front face of the head base is supported by the head holder. The head holder made of the metallic thin plate is extremely thinned in comparison with the thickness of the film supporting plate being a plastic mold. When the head holder is fitted into the front portion of the window of the film supporting plate so as to level the front faces of the head holder and the film supporting plate, the head base is positioned in the state that the head base enters the window of the film supporting plate. Therefore, the protrusion amount of the head base toward the back side is reduced in comparison with the conventional method in which the front face of the head base is supported by the rear face of the film supporting plate. Due to this, it becomes possible to reduce the space of the camera for containing the film supporting plate.

Moreover, the adhesive is applied to the groove defined by the peripheral face of the head base, the rear face of the head holder, and the wall of the window so that the adhesive is prevented from flowing out to the rear face of the film supporting plate, and spreading thereon.

Further, by integrally providing the rib protruding toward the back side at the edge of the head holder, the gap between the wall of the window and the head holder is closed with the root of the rib. Accordingly, when the adhesive is applied to the gap between the rib and the peripheral face of the head base, the adhesive is prevented from flowing out to the front face of the film supporting plate.

Incidentally, in the above-described embodiment, the head base 15 is attached to the head holder 25 after the head holder 25 has been fitted into the window 23 of the film supporting plate 21. However, the head holder 25 to which the head base 15 is already attached may be fitted into the window 23.

Further, in the above-described embodiment, the front faces of the head holder and the film supporting plate are leveled. However, these front faces may not be exactly leveled. In other words, these front faces may be different by a little.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An attaching method for a magnetic head used in a camera loaded with a photographic film, in which said camera has a film supporting plate for supporting a rear face of said photographic film, and said magnetic head contacts a magnetic recording layer formed on said rear face of said photographic film to perform magnetic recording and/or reproduction, said attaching method for said magnetic head comprising the steps of:

fixing a head holder to said film supporting plate in a state that said head holder is inserted in a first opening formed in said film supporting plate, a front face of said head holder being leveled relative to a front face of said film supporting plate coming into contact with said photographic film;

inserting said magnetic head in a second opening formed in said head holder;

positioning said magnetic head so as to protrude from said head holder by a prescribed amount, and so as to properly come into contact with said magnetic recording layer; and fixing said magnetic head to said head holder after positioning said magnetic head.

2. An attaching method for a magnetic head according to claim 1, wherein said film supporting plate is made of a plastic and said head holder is made of a metallic thin plate.

3. An attaching method for a magnetic head according to claim 2, wherein said magnetic head is mounted on a head base, said head base being attached to said head holder so as to fix said magnetic head to said head holder via said head base.

4. An attaching method for a magnetic head according to claim 3, wherein said head base is attached to said head holder by means of an adhesive.

5. An attaching method for a magnetic head according to claim 4, wherein ribs are provided at both sides of said head holder so as to project backward, said magnetic head being securely fixed to said head holder by said adhesive applied between said rib and said head base.

6. An attaching method for a magnetic head according to claim 5, wherein said head holder is provided with at least one tab, said tab being fixed to a projection formed on said film supporting plate.

7. An attaching method for a magnetic head according to claim 6, wherein a number of said tabs is three, two of which are provided at an upper portion of said head holder and one of which is provided at a lower portion thereof.

8. An attachment for a magnetic head used in a camera loaded with a photographic film, in which said camera has a film supporting plate for supporting a rear face of said photographic film, and said magnetic head contacts a magnetic recording layer formed on said rear face of said photographic film to perform magnetic recording and/or reproduction, said attachment for said magnetic head comprising:

a first opening formed in said film supporting plate;

a head holder fixed to said film supporting plate in a state that said head holder is inserted in said first opening, a front face of said head holder being leveled relative to a front face of said film supporting plate coming into contact with said photographic film;

a second opening formed in said head holder, said magnetic head being inserted in said second opening; and an adhesive for fixing said magnetic head to said head holder in a state that said magnetic head protrudes from said head holder by a prescribed amount.

9. An attachment for a magnetic head according to claim 8, wherein said film supporting plate is made of a plastic and said head holder is made of a metallic thin plate.

10. An attachment for a magnetic head according to claim 9, further comprising:

a head base on which said magnetic head is mounted, said magnetic head being fixed to said head holder by means of said adhesive via said head base.

11. An attachment for a magnetic head according to claim 10, wherein said head holder has ribs provided so as to project backward, a part of said adhesive being applied between said rib and a side face of said magnetic head to securely fix said magnetic head to said head holder.

12. An attachment for a magnetic head according to claim 11, wherein said head holder has at least one tab and a hole formed in said each tab, said hole respectively fitting to a projection formed on said film supporting plate.

13. An attachment for a magnetic head according to claim 12, wherein a number of said tabs is three, two of which are provided at an upper portion of said head holder and one of which is provided at a lower portion thereof.

* * * * *